(12) United States Patent
Vemuganti

(10) Patent No.: US 7,600,328 B2
(45) Date of Patent: Oct. 13, 2009

(54) SYSTEM AND METHOD FOR MEASURING FLAKE THICKNESS

(75) Inventor: Gangadhar Rao Vemuganti, Cedar Rapids, IA (US)

(73) Assignee: The Quaker Oats Company, Chicago, IL (US)

( * ) Notice: Subject to any disclaimer, the term of this patent is extended or adjusted under 35 U.S.C. 154(b) by 820 days.

(21) Appl. No.: 11/238,229

(22) Filed: Sep. 29, 2005

(65) Prior Publication Data

US 2007/0071857 A1    Mar. 29, 2007

(51) Int. Cl.
*G01B 5/02* (2006.01)
*G01B 11/06* (2006.01)

(52) U.S. Cl. ...................................... 33/783; 33/501.02

(58) Field of Classification Search .............. 33/501.02, 33/501.03, 501.04, 711, 734, 735, 747, 783, 33/784
See application file for complete search history.

(56) References Cited

U.S. PATENT DOCUMENTS

| | | | |
|---|---|---|---|
| 4,836,459 A | 6/1989 | Holl et al. | |
| 5,392,123 A * | 2/1995 | Marcus et al. | 33/501.09 |
| 5,539,515 A | 7/1996 | Shofner et al. | |
| 5,919,503 A | 7/1999 | Leusner | |
| 6,141,883 A * | 11/2000 | Mitchell et al. | 33/501.02 |
| 6,183,788 B1 | 2/2001 | Leusner | |
| 6,211,470 B1 * | 4/2001 | Beran et al. | 33/1 V |
| 7,343,689 B2 * | 3/2008 | Kondo | 33/501.04 |
| 2004/0200365 A1 | 10/2004 | Young | |
| 2007/0234582 A1* | 10/2007 | Kondo | 33/501.04 |
| 2009/0025239 A1* | 1/2009 | Pan | 33/501.02 |

* cited by examiner

*Primary Examiner*—G. Bradley Bennett
(74) *Attorney, Agent, or Firm*—Banner & Witcoff, Ltd.

(57) ABSTRACT

An automated system for accurately measuring the thickness of a sample quantity of small items such as oat flakes. The system picks individual oat flakes from a hopper using a vacuum and passes them between two precision rollers. One roller is fixed and has vacuum ports to pick up the flake from the hopper. The second roller is floating. As the flake passes between the rollers, the flake is flattened and the second roller is deflected by an amount equal to the thickness of the flake. A vision system comprising a video camera, a light source and a computer measures the deflection of the floating roller. The vision system obtains an image of the curvature of the floating roller at the point opposite the pinch point of the two rollers. Data from the measurement may be recorded on the computer and processed as desired.

17 Claims, 7 Drawing Sheets

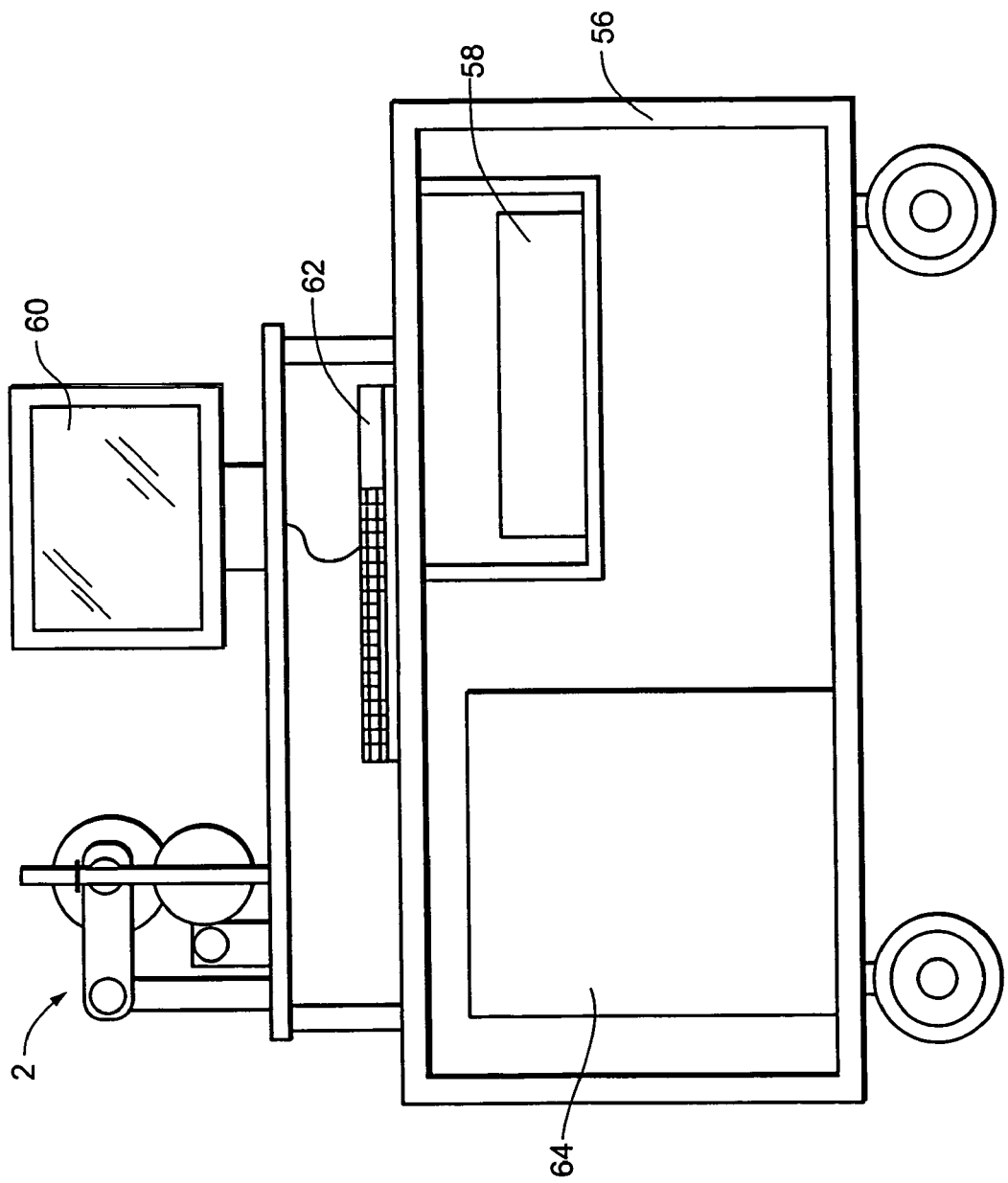

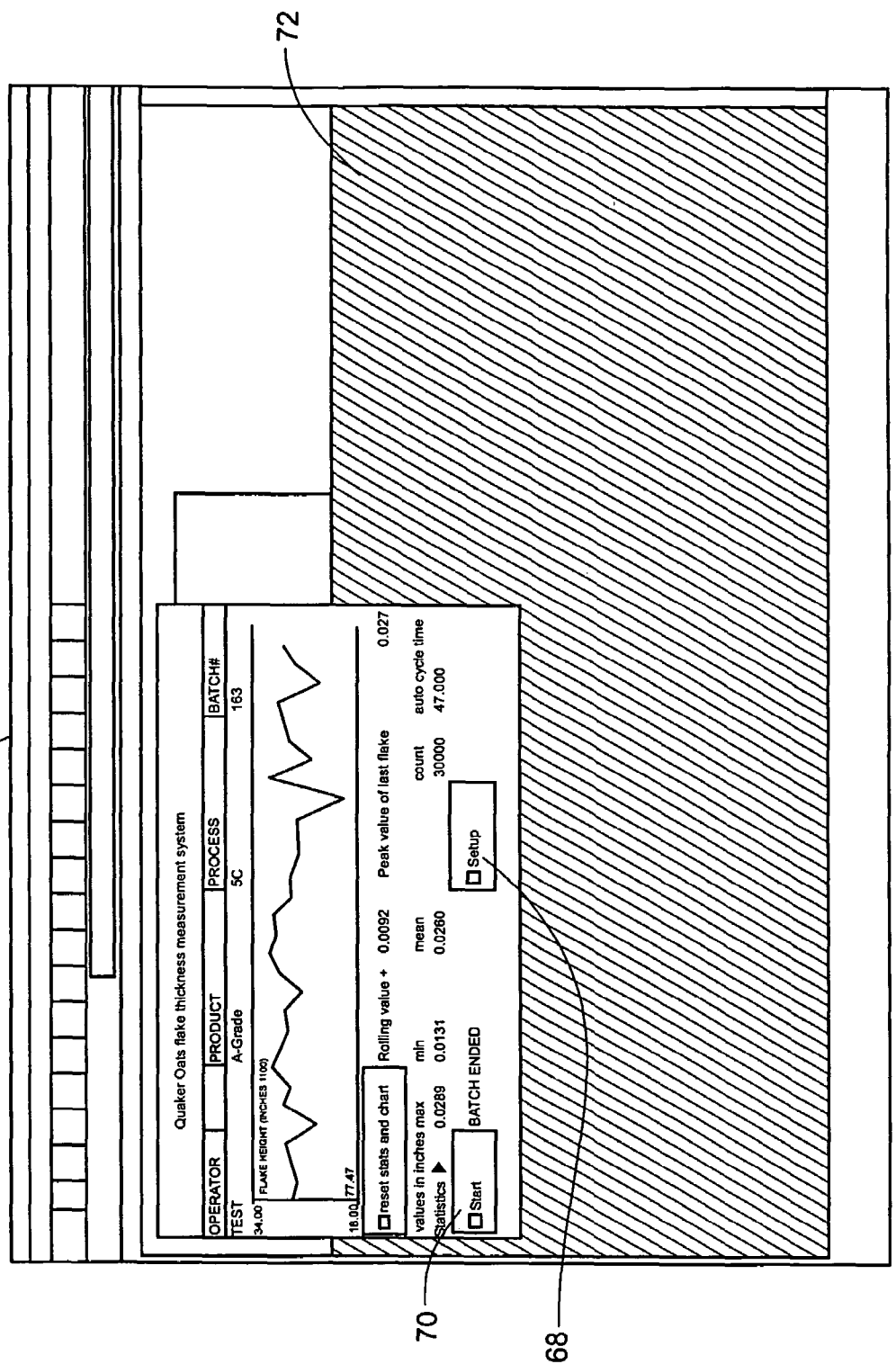

SYSTEM AND METHOD FOR MEASURING FLAKE THICKNESS

FIELD OF THE INVENTION

The invention relates generally to a system and method for measuring the thickness of a small, thin item, and more specifically to a system and method for measuring the thickness of a flaked food product such as an oat flake.

BACKGROUND OF THE INVENTION

In many manufacturing and food processing environments, it is necessary for quality assurance and other purposes to measure accurately the thickness of a small, thin item. For example, oats are processed into a variety of forms for use as a breakfast cereal, including old-fashioned or large flake rolled oats, quick oat flakes, and instant oatmeal. Old-fashioned oats are made of rolled oat groats (dehulled oat kernels) and are prepared to make oatmeal by cooking in boiling water for up to thirty minutes. Quick oat cereal consists of flakes made by rolling cut groats thinner than old-fashioned oat flakes. Quick oat flakes are prepared by cooking in boiling water for 1 to 15 minutes. Instant oatmeal is similar to quick oats but with additional treatments, such as the addition of a hydrocolloid gum to accelerate hydration. Instant oatmeal is prepared by adding hot water and stirring, without any additional cooking being required. Instant oatmeal may also be prepared by adding cold water and heating the mixture briefly in a microwave oven.

The production of old-fashioned oats and quick oat flakes is essentially the same, except for the starting material. Old fashioned oats start with whole groats and quick oats start with steel-cut groats. After being steamed, both are then rolled between two metal rollers, the spacing of which is adjusted to produce the flake thickness required for each product. Quick oats are rolled thinner than old-fashioned oats so that they will cook faster. For instant oatmeal, the flakes are rolled even thinner than for quick oats. Generally, quick oats have a thickness in the range of about 0.015 to 0.022 inches, while old-fashioned oats may have a thickness of up to about 0.05 inch.

For quality assurance purposes, it is necessary to sample oats from a production run and measure their thickness. A fairly uniform flake thickness is desirable in each processed batch of flakes to, for example, assure uniform cooking times and deliver the desired consistency and texture in the final cooked cereal product.

Previously, measurements of this type were done manually using a micrometer. Since this was done by hand, the process was time-consuming, labor-intensive and inconvenient. Further, measurements were prone to being both inaccurate and inconsistent for several reasons. The micrometer compresses the flake, and depending on the pressure applied could yield inaccurate results. Further, the pressure applied could vary not only from flake to flake, but also due to different techniques used by different human operators. Although some automated approaches have been proposed and represent an improvement over the manual approach, such approaches suffer other shortcomings, such as their inability to handle overlapping flakes and difficulty in accurately measuring curved flakes.

BRIEF SUMMARY OF THE INVENTION

The invention is directed to an automated system for accurately measuring the thickness of a sample quantity of small items such as oat flakes. The system of the invention picks individual oat flakes from a hopper using a vacuum and passes them between two precision rollers. One roller is fixed and has vacuum ports to pick up the flake from the hopper. The second roller is floating. As the flake passes between the rollers, the flake is flattened and the second roller is deflected by an amount equal to the thickness of the flake. A vision system comprising a video camera, a light source and a computer measures the deflection of the floating roller. The vision system obtains an image of the curvature of the floating roller at the point opposite the pinch point of the two rollers. Data from the measurement may be recorded in the memory of the computer and processed as desired.

BRIEF DESCRIPTION OF THE DRAWINGS

FIG. 6 is a front view of the roller apparatus mounted on a cart with the computer and display of the thickness measuring system.

FIG. 7 is an operator interface screen displayed by the system.

DETAILED DESCRIPTION OF THE PREFERRED EMBODIMENT

Figure 1:
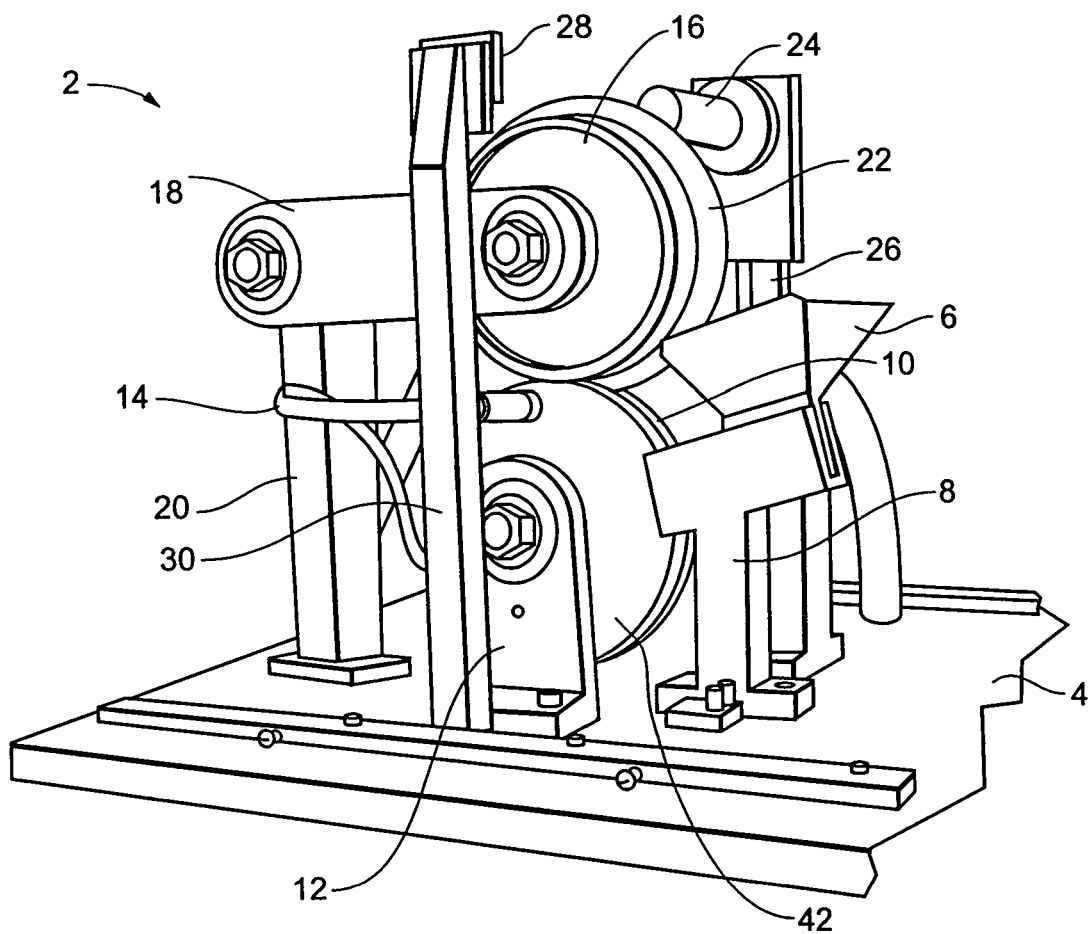
FIG. 1 is a front perspective view of the roller assembly of the thickness measuring apparatus of the invention.
Figure 2:
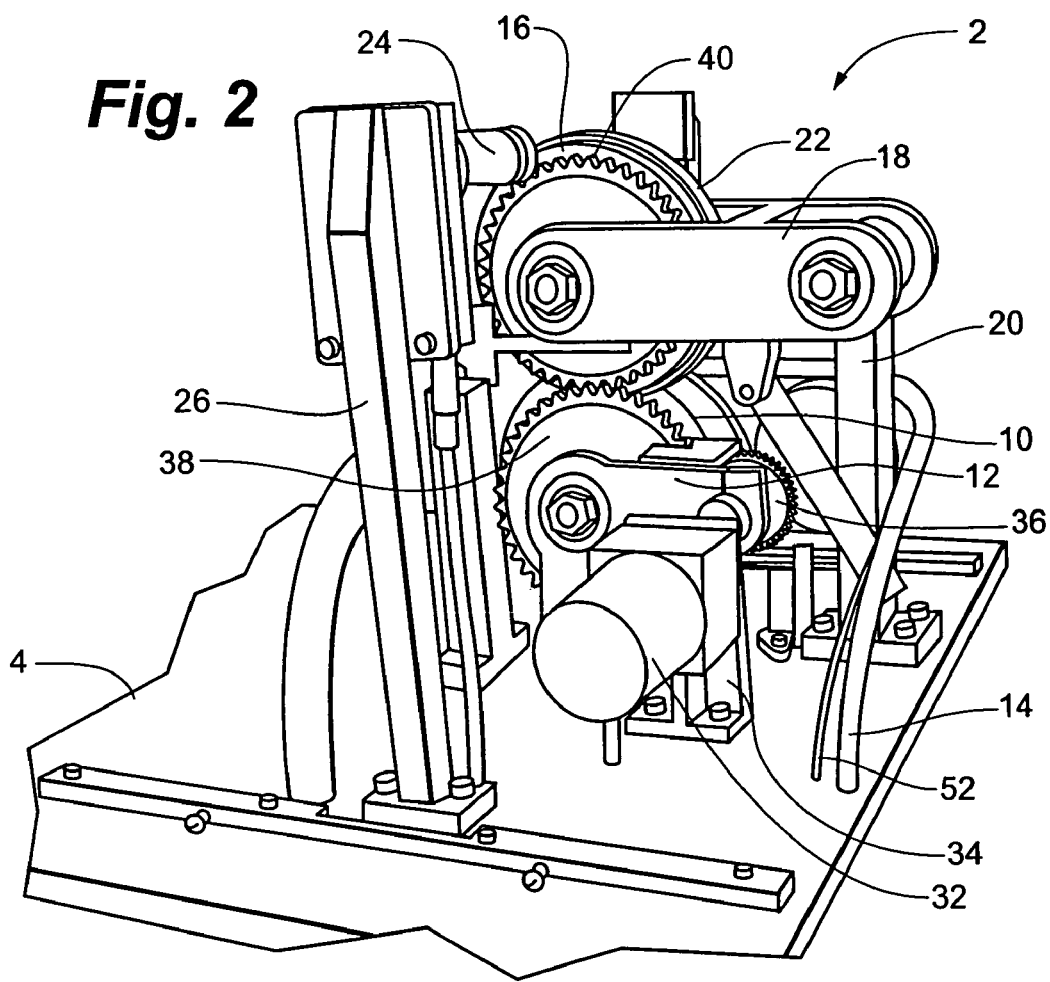
FIG. 2 is a rear perspective view of the roller assembly of FIG. 1

With reference to FIGS. 1 and 2, the system of the invention includes a roller assembly 2 which is mounted on platform 4. A hopper 6 for holding a quantity of oat flakes to be sampled is supported above platform 4 by hopper support 8. A vacuum roller 10 is mounted for rotation in vacuum roller support 12. A vacuum hose 14 connected to a vacuum pump (not shown) provides a vacuum to vacuum roller 10. Compression roller 16 is mounted for rotation on one end of pivot arm 18. The other end of pivot arm 18 is pivotally mounted to pivot arm support 20. By virtue of this arrangement, compression roller 16 is floating, i.e., free to move up and away from vacuum roller 10 when a flake passes between the two rollers. Vacuum roller 10 and compression roller 16 are preferably made of pre-hardened stainless steel. In a preferred embodiment, compression roller 16 is 5.0 inches in diameter, and vacuum roller 10 is 5.125 inches in diameter. A perimeter plate 22 is coaxially mounted to compression roller 16. In a preferred embodiment, the perimeter plate 22 is approximately 6.0 inches in diameter.

A digital camera 24 is supported above platform 4 by camera support 26. Camera 24 is positioned to view the upper peripheral edge of compression roller 16. A light source 28 is supported above platform 4 by light support 30. Light source 28 is positioned to back light the upper edge of perimeter plate 22 vis á vis camera 24, thus creating a shadow that is detected by camera 24.

A motor 32 is supported by motor mount 34. When motor 32 is energized, it directly rotates motor drive gear 36 which is attached to the shaft of motor 34. A vacuum roller drive gear 38 is coaxially connected to vacuum roller 10, and a compression roller drive gear 40 is coaxially connected to compression roller 16. The respective teeth of motor drive gear 36, vacuum roller drive gear 38 and compression roller drive gear 40 engage one another such that motor 32 causes all of the gears to rotate, which in turn causes vacuum roller 10 and compression roller 16 to rotate. The teeth of vacuum roller drive gear 38 and compression roller drive gear 40 are of sufficient size that they remain engaged for rotation even when compression roller 16 is deflected by the passage of a flake between the rollers. In operation, the speed of rotation of the rollers is approximately 4 rpm.

Figure 3:
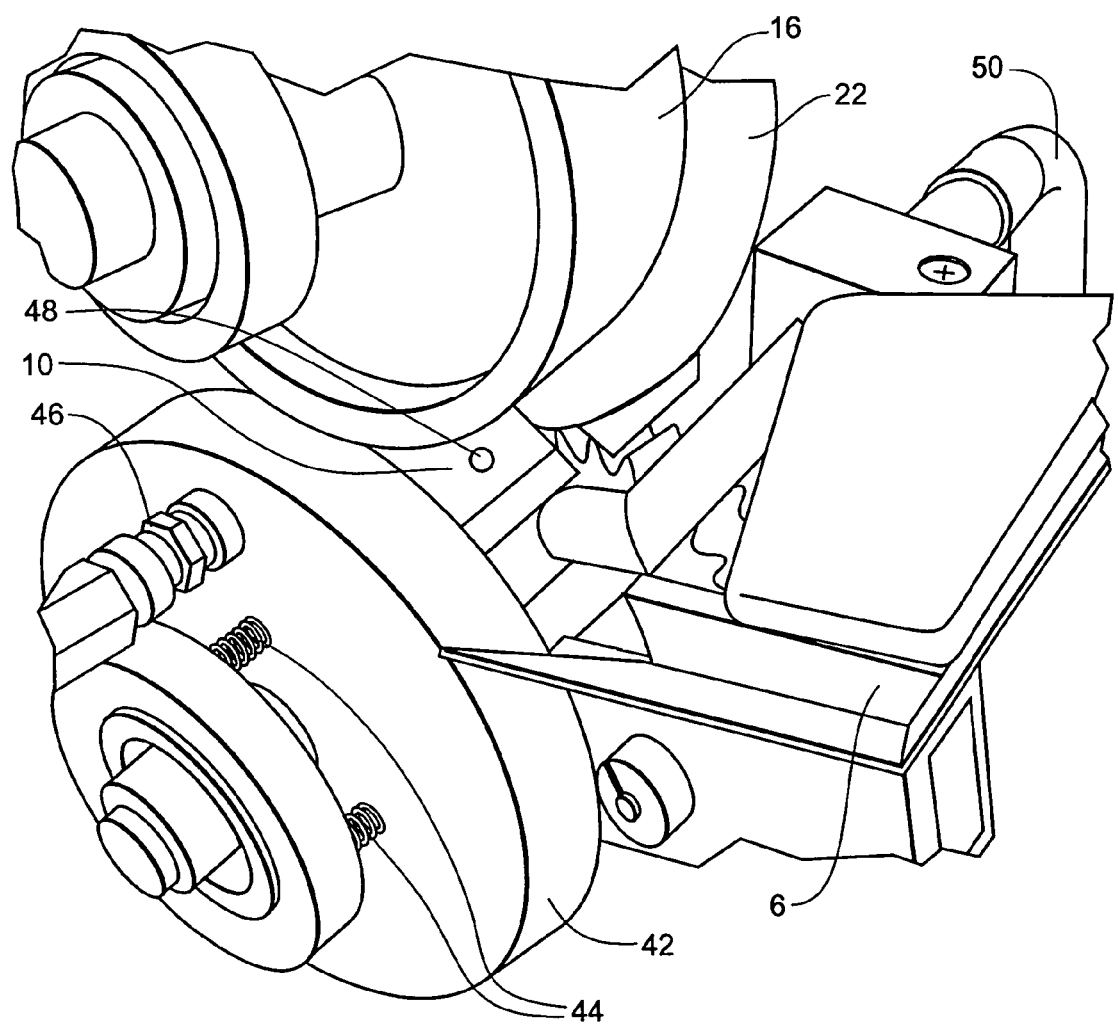
FIG. 3 is a partial detailed front perspective view of the roller assembly of the apparatus.
Figure 4:
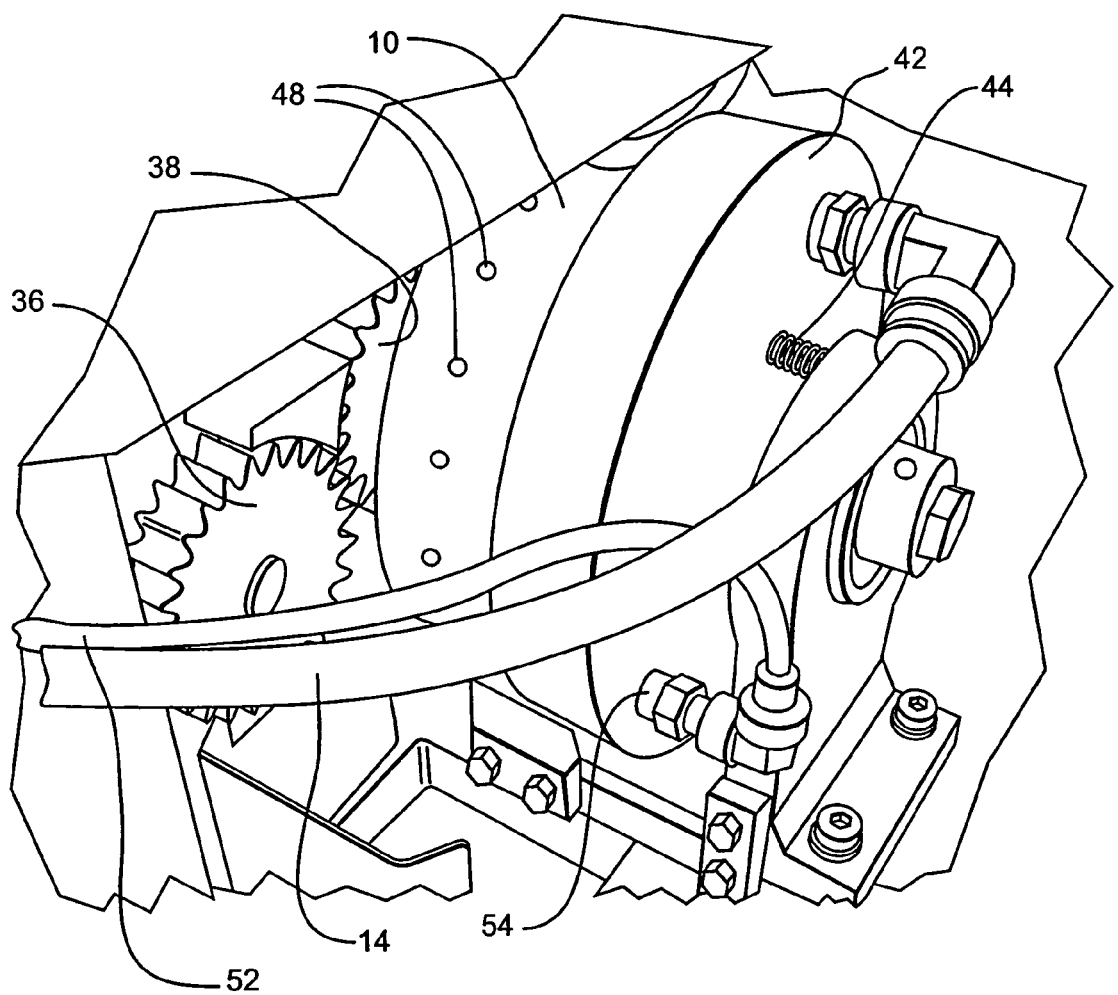
FIG. 4 is a partial detailed rear perspective view of the roller assembly of the apparatus.
Figure 5:
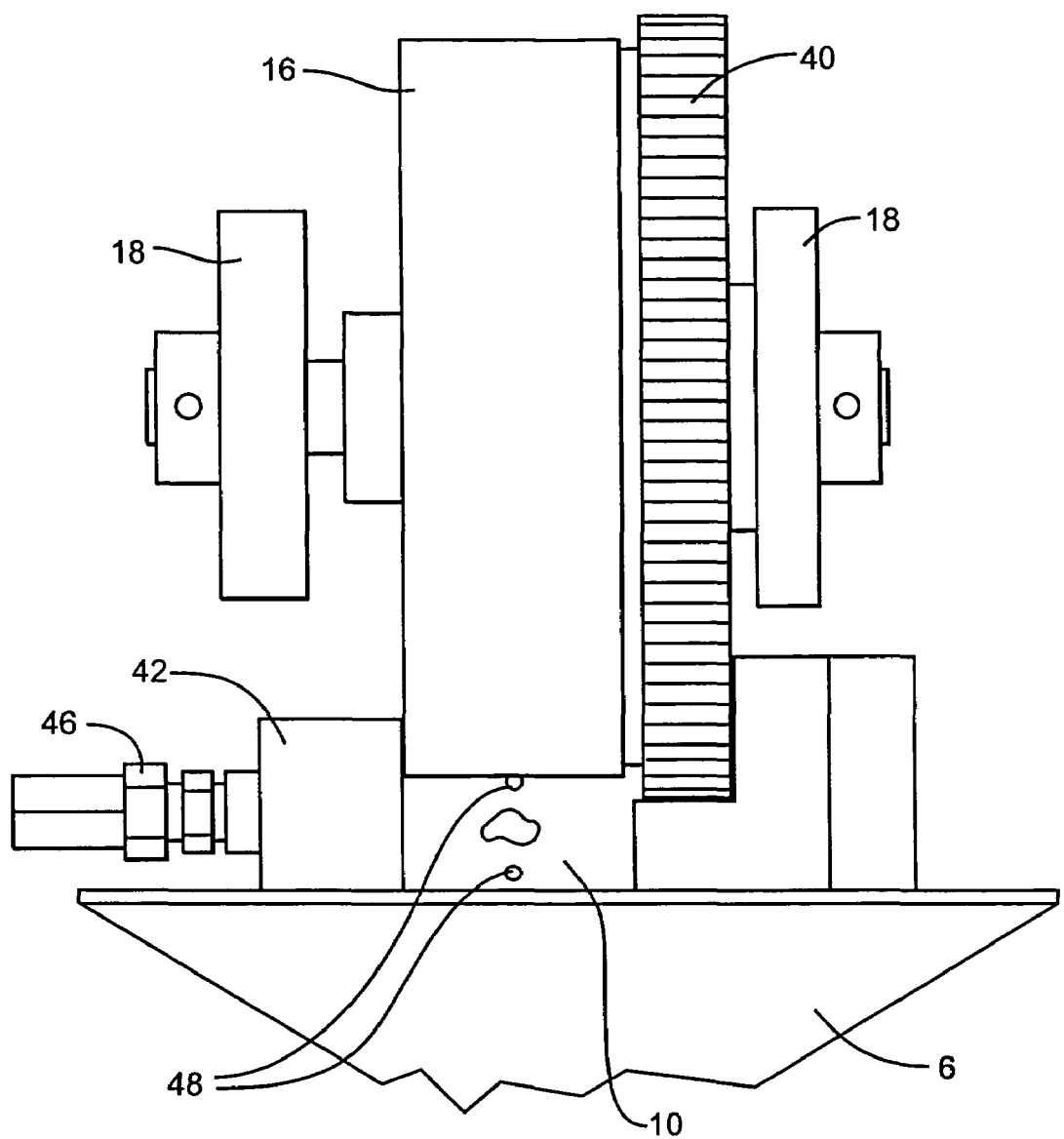
FIG. 5 is a partial side elevation view of the roller assembly of the apparatus.

As best seen in FIGS. 3, 4 and 5, a vacuum plate 42 is closely positioned against vacuum roller 10 and is urged into contact therewith in clutch-like fashion by springs 44. Vacuum hose 14 is connected to vacuum plate 42 by fitting 46. Apertures in the adjacent sides of vacuum plate 42 and vacuum roller 10 (not visible) permit a vacuum to be applied to vacuum roller 10 while permitting vacuum roller 10 to rotate freely. Vacuum plate 42 is preferable made of plastic with a low coefficient of friction to permit vacuum roller 10 to rotate freely. The face of vacuum roller 10 has a series of 18 small holes 48 spaced equally about its perimeter to permit vacuum pickup of flakes. The number and spacing of holes 48 are selected to ensure that only one flake at a time passes between the rollers. The vacuum applied to vacuum roller 10 is in the range of about 4 to 8 inches Hg. A second vacuum hose 50 is positioned to remove excess flakes from compression roller 16. The vacuum applied to remove excess flakes is in the range of about 5 to 10 inches Hg. Pressurized air at about 15-20 psi is provided via blow-off hose 52 and nozzle 54 to blow compressed flakes off the rollers after measurement.

For convenience, roller assembly 2 and other system components may be mounted on a cart 56 as shown in FIG. 6. Cart 56 also holds computer 58, display 60 and keyboard 62, as well as equipment for providing and regulating the required vacuum and pressurized air (not shown in detail) which are housed in cabinet 64. The system may be connected to a plant compressed air supply which is typically available at a production or testing facility. Preferably, the compressed air supply is at about 80 psi. The flow of air may be controlled by a solenoid valve and the required amount of vacuum or pressurized air may be provided to each part of the system by adjusting a set of pressure regulators (not shown). Alternately, the system can be completely self-contained by providing a compressor and/or vacuum pump with appropriate valves and pressure regulators, which may be located in cabinet 64.

Computer 58 is programmed with an appropriate operating system and camera application software which controls the operation of the system and, preferably, provides a graphical user interface for the operator via display 60. A standard computer mouse (not shown) may be provided for use in conjunction with the graphical user interface.

After computer 58 is booted with all the required operating systems, the operator opens the camera application software, which is pre-configured to the system operation requirements. The operator interface screen 66 which is displayed on display 60 is shown in FIG. 7. The operator enters the test data including operator name, process name and product name by clicking on the Setup button 68 shown in FIG. 7 and selecting the appropriate items from a drop-down menu. The operator places a small amount of screened oat flakes in hopper 6. The operator then activates the system by clicking on the Start button 70 shown in FIG. 7. This will activate the vacuum system by opening a solenoid valve in the compressed air supply line, energize motor 32 to drive the rollers, and activate camera 24 to take pictures.

Oat flakes are inducted from an opening at the bottom of hopper 6 by the vacuum system. More specifically, individual flakes are picked up by vacuum roller 10 by way of the vacuum present at holes 48 on the face of vacuum roller 10. Excess flakes are removed by vacuum hose 50. The individual flakes pass between the rotating rollers. As a flake passes through, compression roller 16 is deflected upwards by a distance equal to the thickness of the flake. Camera 24 views the deflection of perimeter plate 22 which is attached to moveable compression roller 16 from the edge by viewing it against backlight 28. The camera image 72 of the shadow of perimeter plate 22 is displayed on the operator interface screen 66 as shown in FIG. 7. Camera image 72 will move as a flake passes between the rollers and compression roller 16 is deflected, providing the operator with a visual indication of the operation of the system and the relative thickness of the flakes. The accuracy of the system is increased by viewing the curvature of perimeter plate 22 rather than a single point. Perimeter plate 22 is preferably made of a dark, non-reflective material to prevent light reflection from floating compression roller 16, which might cause an inaccuracy in measurement. Perimeter plate 22 also prevents measuring any extra flakes which were not blown on compression roller 16. The curvature measurement is positioned directly opposite (i.e., 180° away from) the pinch point of the two rollers. Measurement data for each flake in the sample batch is recorded and stored in the memory of computer 58. At the end of the batch of flakes the system stops and displays the results, including the minimum, maximum and mean of flake thickness, elapsed time and incremented batch count, as shown in FIG. 7. The operator will then remove any leftover flakes from hopper 6 to prepare the system for the next test.

Preferably, polarizing filters (not shown) are provided on both camera 24 and light 28 to minimize glare and thus further enhance accuracy. Camera 24 preferably operates at a rate in excess of 20 frames per second and has a resolution of approximately 0.00018 inches per pixel, to assure accuracy for flakes having thicknesses in the range of about 0.0145 to 0.050 inches. The image from camera 24 is transmitted to computer 58 and displayed on display 60. Computer 58 may be a personal computer with a standard operating system and components. Computer 58 is programmed to measure the deflection of compression roller 16 from the camera image and thus obtain the thickness of each flake. Thickness data is stored in memory in computer 58, which may be connected to a network to permit data to be transferred to a central computer if desired.

The use of a computer as part of the system affords simple control and great flexibility. The entire process may be operated under computer control. The computer may be programmed to, for example, configure sample data, control the system, perform and desired statistical analysis on the date, archive data, report data to a central computer via a network, and display camera images and data in various formats on the display.

In a preferred embodiment, camera 24, light 28, the polarizing lenses and the camera application software comprise a vision system, preferably the In-Sight machine vision system available from Cognex Corporation of Natick, Mass., which includes Cognex In-Sight Explorer camera application software.

The system and method of the invention thus have numerous advantages. The process is automatic, reducing significantly the labor and time required for measurements. The measurement is highly accurate, with tests indicating a measurement that is accurate within ±0.001 inches. Although the flakes are compressed and flatted, they are not damaged.

While the compression is similar to that of a manual micrometer, it is consistent from flake-to-flake and batch-to-batch.

Although the invention has been described in terms of a preferred embodiment, numerous variations and modifications will be apparent without departing from the scope and spirit of the invention as defined by the following claims.

What is claimed is:

1. Apparatus for measuring the thickness of an item, comprising:
   a hopper for holding a sample quantity of the item;
   a first roller mounted for rotation;
   a second roller mounted for rotation and movable from a first position wherein the face of the second roller is in tangential contact with the face of the first roller to a second position wherein there is a gap between the face of the first roller and the face of the second roller;
   means for feeding individual items from the hopper and causing the items to pass between the rollers;
   a vision system for generating an image signal representing the deflection of the second roller as an item passes between the first and second rollers; and
   processing means for receiving the image signal from the vision system and calculating the thickness of the item by measuring said deflection of the second roller.

2. The apparatus of claim 1 wherein the means for feeding comprises a vacuum pickup system.

3. The apparatus of claim 2 wherein the first roller has a plurality of apertures on the periphery of its face, and a vacuum is applied to the interior of the first roller causing items to be picked up by the vacuum at each aperture.

4. The apparatus of claim 1 wherein the vision system comprises a light source located adjacent the top edge of the second roller and a camera located on the opposite side of the second roller from the light source.

5. The apparatus of claim 4 further comprising a polarizing filter mounted on at least one of the camera and the light source.

6. The apparatus of claim 1 wherein the item is an oat flake.

7. The apparatus of claim 1 wherein the first and second rollers are driven by a motor and a set of gears.

8. The apparatus of claim 1 wherein the processing means performs statistical analysis on the measurements of a plurality of items measured.

9. A method for measuring the thickness of an item, comprising:
   providing a sample quantity of items to be measured;
   passing an item from the sample quantity between a pair of rollers, wherein the first roller is fixed and the second roller is floating;
   measuring the deflection of the second roller as the item passes between the pair of rollers, which further comprises the steps of:
      backlighting the edge of the second roller;
      positioning a camera to obtain an image of the second roller, and
      calculating the deflection of the second roller based on the change of the image as the item passes between the rollers; and
   calculating the thickness of the item based on the deflection of the second roller.

10. The method of claim 9 further comprising the step of inducting an item from the sample quantity of items and transferring the item to the face of the first roller by means of a vacuum pickup.

11. The method of claim 9 wherein the measurement of the deflection of the second roller comprises obtaining an image of the curvature of the second roller at a point directly opposite the pinch point of the first and second rollers.

12. The method of claim 9 further comprising using a polarizing filter on at least one of the backlight source and the camera.

13. The method of claim 9 wherein the item is an oat flake.

14. The method of claim 9 further comprising rotating the first and second rollers by a motor and gear drive.

15. The method of claim 9 further comprising storing the thickness measurement in a computer memory.

16. The method of claim 15 further comprising performing statistical analysis on a plurality of stored measurements.

17. A method for measuring the thickness of an item, comprising:
   providing a sample quantity of items to be measured;
   passing an item from the sample quantity between a pair of rollers, wherein the first roller is fixed and the second roller is floating;
   measuring the deflection of the second roller as the item passes between the pair of rollers, which further comprises the steps of:
      positioning a camera to obtain an image of the second roller, and
      calculating the deflection of the second roller based on the change of the image as the item passes between the rollers; and
   calculating the thickness of the item based on the deflection of the second roller.

* * * * *